US008064927B2

(12) United States Patent
Hsu et al.

(10) Patent No.: US 8,064,927 B2
(45) Date of Patent: Nov. 22, 2011

(54) WIRELESS LOCAL ACCESS NETWORK SYSTEM DETECTION AND SELECTION

(75) Inventors: Raymond Tah-Sheng Hsu, San Diego, CA (US); Ragulan Sinnarajah, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/844,726

(22) Filed: Jul. 27, 2010

(65) Prior Publication Data

US 2010/0291863 A1    Nov. 18, 2010

Related U.S. Application Data

(63) Continuation of application No. 11/562,384, filed on Nov. 21, 2006, now Pat. No. 7,778,593, which is a continuation of application No. 10/373,346, filed on Feb. 24, 2003, now Pat. No. 7,146,130.

(51) Int. Cl.
*H04Q 7/20* (2006.01)

(52) U.S. Cl. ............. 455/456.2; 455/458; 455/3.04; 455/3.01; 455/552.1

(58) Field of Classification Search .......... 455/3.04, 455/458, 456.2, 552.1, 456.1, 433, 411, 422.1, 455/414.1, 179.1, 160, 41.2, 435.2, 443, 455/436, 3.01, 420; 370/352, 328, 338, 329, 370/331, 252, 401, 419, 312, 324, 343, 326; 709/218, 227, 51, 78
See application file for complete search history.

(56) References Cited

U.S. PATENT DOCUMENTS

| | | | |
|---|---|---|---|
| 5,260,988 A | 11/1993 | Schellinger et al. | |
| 5,610,973 A | 3/1997 | Comer | |
| 5,706,331 A | 1/1998 | Wang et al. | |
| 5,870,673 A | 2/1999 | Haartsen | |
| 6,128,490 A | 10/2000 | Shaheen et al. | |
| 6,317,605 B1 | 11/2001 | Sakuma | |
| 6,477,372 B1 | 11/2002 | Otting et al. | |
| 6,510,323 B1 | 1/2003 | Stocker et al. | |
| 6,532,368 B1 * | 3/2003 | Hild et al. ................ 455/515 |
| 6,577,871 B1 | 6/2003 | Budka et al. | |
| 6,836,471 B2 | 12/2004 | Holma et al. | |
| 6,904,029 B2 | 6/2005 | Fors et al. | |
| 6,980,816 B2 | 12/2005 | Rohles et al. | |
| 6,990,343 B2 | 1/2006 | Lefkowitz | |
| 6,993,335 B2 | 1/2006 | Natarajan et al. | |
| 7,010,306 B1 | 3/2006 | Tanibayashi et al. | |

(Continued)

FOREIGN PATENT DOCUMENTS

EP       1133208 A2    9/2001

(Continued)

OTHER PUBLICATIONS

IEEE 100, The Authoritative Dictionary of IEEE Standards Terms, Seventh Edition, p. 872, copyright: 2000.

(Continued)

*Primary Examiner* — Tan Trinh
(74) *Attorney, Agent, or Firm* — Kristine U. Ekwueme

(57) ABSTRACT

Method and apparatus for detection and selection of Wireless Local Area Network (WLAN) service. A cellular network may provide an advertisement for a WLAN, such as in an overhead signaling message. The advertisement may identify the Access Point(s) by an Extended Service Set Identifier (ESSID). The remote station may then scan for the WLAN service automatically or manually.

52 Claims, 9 Drawing Sheets

U.S. PATENT DOCUMENTS

| | | | |
|---|---|---|---|
| 7,039,027 | B2 | 5/2006 | Bridgelall |
| 7,039,031 | B1 | 5/2006 | Joeressen |
| 7,054,620 | B2 | 5/2006 | Ewert et al. |
| 7,054,627 | B1 | 5/2006 | Hillman |
| 7,103,313 | B2 | 9/2006 | Heinonen et al. |
| 7,103,661 | B2 | 9/2006 | Klein |
| 7,116,970 | B2 | 10/2006 | Brusilovsky et al. |
| 7,133,677 | B2 | 11/2006 | Feder et al. |
| 7,146,130 | B2 | 12/2006 | Hsu et al. |
| 7,149,521 | B2 | 12/2006 | Sundar et al. |
| 7,171,198 | B2 | 1/2007 | Paila et al. |
| 7,171,460 | B2 | 1/2007 | Kalavade et al. |
| 7,193,993 | B2 | 3/2007 | Silvester |
| 7,200,112 | B2 | 4/2007 | Sundar et al. |
| 7,203,183 | B2 | 4/2007 | Cromer et al. |
| 7,224,677 | B2 | 5/2007 | Krishnamurthi et al. |
| 7,266,101 | B2 | 9/2007 | Dorenbosch |
| 7,274,909 | B2 | 9/2007 | Perttila et al. |
| 7,293,109 | B2 | 11/2007 | Ott et al. |
| 7,295,556 | B2 * | 11/2007 | Roese et al. ............... 370/395.3 |
| 7,380,268 | B2 * | 5/2008 | Challener et al. ................. 726/2 |
| 7,412,240 | B2 | 8/2008 | Hunkeler |
| 7,460,856 | B2 | 12/2008 | Sundberg |
| 7,508,799 | B2 | 3/2009 | Sumner et al. |
| 7,599,323 | B2 | 10/2009 | Chandranmenon et al. |
| 7,778,593 | B2 * | 8/2010 | Hsu et al. ...................... 455/3.04 |
| 7,898,977 | B2 * | 3/2011 | Roese et al. ................. 370/254 |
| 2002/0022483 | A1 | 2/2002 | Thompson et al. |
| 2002/0111166 | A1 | 8/2002 | Monroe |
| 2002/0147008 | A1 | 10/2002 | Kallio |
| 2003/0118015 | A1 | 6/2003 | Gunnarsson et al. |
| 2003/0119441 | A1 | 6/2003 | Simons et al. |
| 2003/0203731 | A1 | 10/2003 | King et al. |
| 2003/0207683 | A1 | 11/2003 | Lempio et al. |
| 2004/0014422 | A1 | 1/2004 | Kallio |
| 2004/0014456 | A1 | 1/2004 | Vnnen |
| 2004/0023669 | A1 * | 2/2004 | Reddy ........................ 455/456.1 |
| 2004/0038645 | A1 * | 2/2004 | Rcunamaki et al. ......... 455/41.2 |
| 2004/0052232 | A1 | 3/2004 | Ramaswamy et al. |
| 2004/0076126 | A1 | 4/2004 | Qu et al. |
| 2004/0102195 | A1 | 5/2004 | Naghian et al. |
| 2004/0105434 | A1 * | 6/2004 | Baw .............................. 370/355 |
| 2004/0114553 | A1 * | 6/2004 | Jiang et al. ................... 370/328 |
| 2004/0198220 | A1 | 10/2004 | Whelan et al. |
| 2004/0198279 | A1 | 10/2004 | Anttila et al. |
| 2004/0203630 | A1 | 10/2004 | Wang |
| 2004/0203787 | A1 | 10/2004 | Naghian |
| 2004/0203788 | A1 * | 10/2004 | Fors et al. ..................... 455/439 |
| 2004/0203836 | A1 | 10/2004 | Gorday et al. |
| 2004/0213181 | A1 | 10/2004 | Grech et al. |
| 2004/0214572 | A1 * | 10/2004 | Thompson et al. ........ 455/435.2 |
| 2005/0043026 | A1 | 2/2005 | Brok et al. |
| 2005/0181764 | A1 | 8/2005 | Hahn et al. |
| 2005/0181765 | A1 | 8/2005 | Mark |
| 2006/0025161 | A1 | 2/2006 | Funato et al. |
| 2006/0156370 | A1 | 7/2006 | Parantainen |
| 2007/0086441 | A1 | 4/2007 | Kall et al. |
| 2007/0124490 | A1 | 5/2007 | Kalavade et al. |
| 2008/0013487 | A1 * | 1/2008 | Molteni et al. ................ 370/329 |
| 2008/0101291 | A1 * | 5/2008 | Jiang et al. .................... 370/331 |

FOREIGN PATENT DOCUMENTS

| | | |
|---|---|---|
| GB | 2343337 | 9/2003 |
| JP | 10327463 | 12/1998 |
| JP | 2001060910 A | 3/2001 |
| JP | 2002112347 | 4/2002 |
| JP | 2002135203 | 5/2002 |
| JP | 2002236632 | 8/2002 |
| JP | 2002252620 | 9/2002 |
| JP | 2002351766 | 12/2002 |
| JP | 2002353883 | 12/2002 |
| JP | 2003510897 | 3/2003 |
| KR | 1997011532 | 7/1997 |
| KR | 20000035888 | 6/2000 |
| KR | 20020054449 | 7/2002 |
| WO | WO0122662 | 3/2001 |
| WO | WO0135585 A1 | 5/2001 |
| WO | WO03061177 A2 | 7/2003 |
| WO | WO2004032539 A1 | 4/2004 |

OTHER PUBLICATIONS

International Search Report, PCT/US2004/005541—International Search Authority—Europeant Patent Office—Oct. 5, 2004.

Taiwanese Search report—093104651—TIPO—Aug. 26, 2010.

Written Opinion, PCT/US2004/005541—International Search Authority—Europeant Patent Office—Oct. 5, 2004.

* cited by examiner

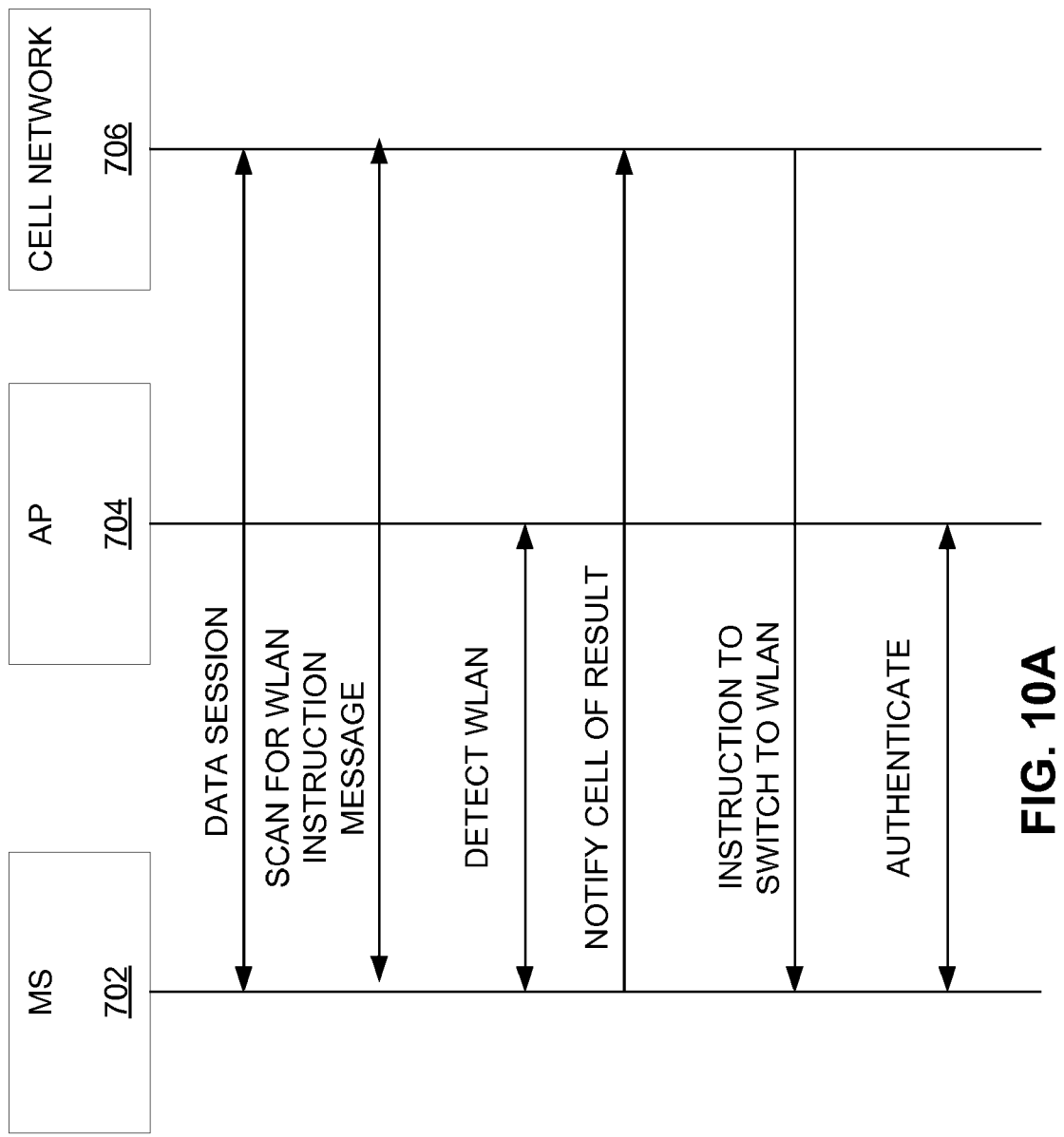

WIRELESS LOCAL ACCESS NETWORK SYSTEM DETECTION AND SELECTION

CLAIM OF PRIORITY UNDER 35 U.S.C. §120

The present application for patent is a Continuation and claims priority to patent application Ser. No. 11/562,384 entitled "Wireless Local Access Network System Detection and Selection" filed Nov. 21, 2006 which is a continuation of application Ser. No. 10/373,346 entitled "Wireless Local Access Network System Detection and Selection" filed Feb. 24, 2003, now allowed, and assigned to the assignee hereof and hereby expressly incorporated by reference herein.

REFERENCE TO CO-PENDING APPLICATIONS FOR PATENT

The present application for patent is related to the following co-pending U.S. patent applications:

"WIRELESS LOCAL ACCESS NETWORK SYSTEM DETECTION AND SELECTION" by Raymond T. Hsu et al., having patent application Ser. No. 10/374,810, filed Feb. 24, 2003, assigned to the assignee hereof, and expressly incorporated by reference herein; and "WIRELESS LOCAL ACCESS NETWORK SYSTEM DETECTION AND SELECTION" having patent application Ser. No. 10/373,557, filed Feb. 24, 2003, assigned to the assignee hereof, and expressly incorporated by reference herein.

BACKGROUND

1. Field

The present invention relates generally to communication systems, and more specifically to detection of a Wireless Local Access Network (WLAN) by a mobile station in a cellular communication system.

2. Background

Wireless Local Access Networks (WLANs) provide wireless access to a communication network within a local geographical area, such as a building or in a cybercafe. WLANs are currently considered by many cellular carriers to alleviate loading of a cellular system, so as to increase capacity. Additionally, users desire access to local WLANs to enhance reception and data rates of communications through a wireless device. A problem exists in detecting and selecting WLAN systems. The purpose of system detection is to detect the availability of a wireless access medium (e.g., cdma2000, WLAN, etc.). The purpose of system selection is to select an access medium for transporting application contents. System selection may be based on the availability of access media, preference policy, application status, user intervention, etc., or a combination thereof.

Typically, a cellular system transmits a paging indicator periodically to page a mobile station when there is a pending communication. Similarly, a WLAN may be advertised by a beacon transmitted by the WLAN. Both the paging indicator and the beacon require the mobile station to scan for the transmitted signal. As the mobile station often has little information as to the location and accessibility of a WLAN, the mobile station may scan for the WLAN periodically expending considerable power. There is a need therefore for an efficient, accurate method of system detection and selection.

BRIEF DESCRIPTION OF THE DRAWINGS

FIG. 10A is a timing diagram illustrating WLAN detection and selection.

DETAILED DESCRIPTION

The word "exemplary" is used herein to mean "serving as an example, instance, or illustration." Any embodiment described herein as "exemplary" is not necessarily to be construed as preferred or advantageous over other embodiments.

An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Figure 1:
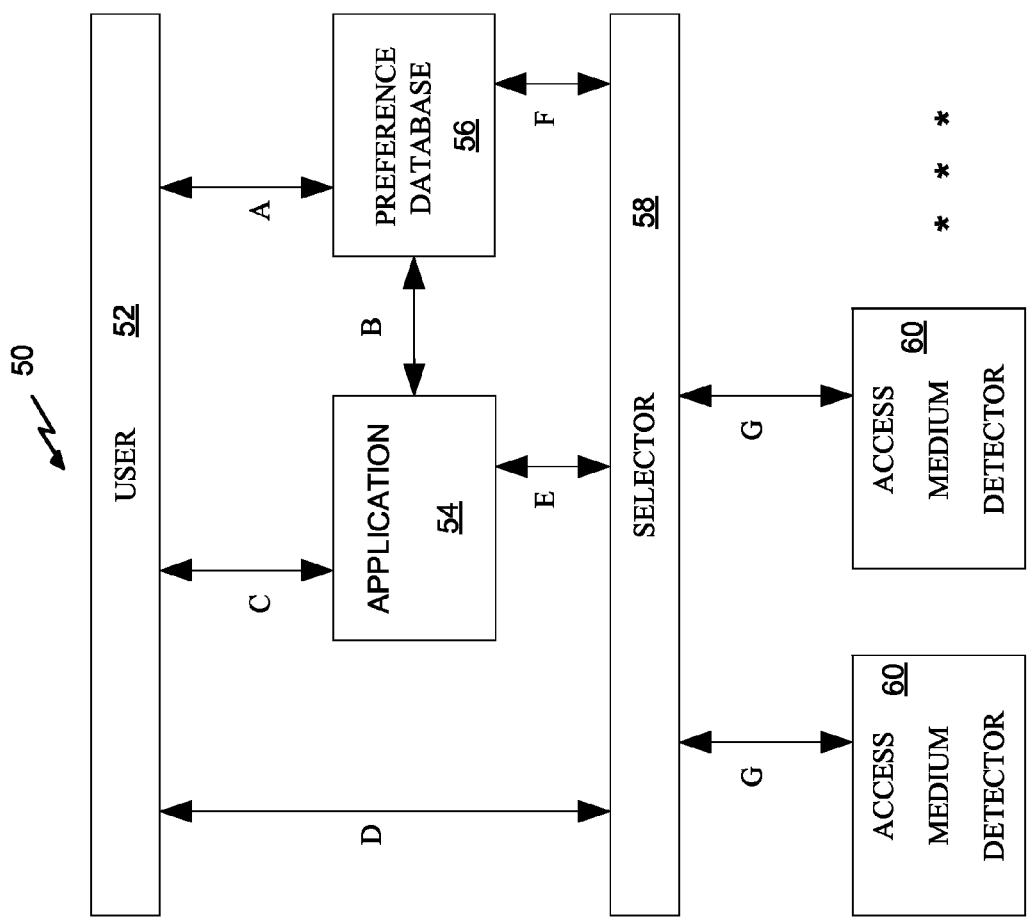
FIG. 1 is a mobile station adapted for system detection and selection.

FIG. 1 illustrates the components and interfaces for the system detection and selection according to one embodiment.

Within system 50, a user 52 represents a user of a wireless mobile unit, wherein the user 52 is a human capable of manually selecting an access medium or implementing an automatic selection process. An application 54 is a computer-readable program or protocol stack (e.g., Transmission Control Protocol (TCP)/Internet Protocol (IP) stack) requiring an access medium for transport. The application 54 communicates with the user 52 via interface C. The application 54 also communicates with a preference database 56 via interface B, and with a selector 58 via interface E.

The preference database 56 is a memory device storing a system selection criteria. The system selection criteria may be configured manually by the user 52 or manipulated automatically by the application 54. In one embodiment, the system selection criterion considers the availability of wireless access and selects WLAN when available. In one example, if the system 50 is currently communicating via the cellular network, such as a cdma2000 network, the system 50 is instructed to continue such communication but to continue to try to detect the availability of WLAN. The application 54 may configure the preference database 56 automatically. The user 52 may manually configure the preference database 56 and enable/disable the application 54.

An Access Medium Detector (AMD) 60 detects the availability of a wireless access medium and reports the results to the selector 58. The selector 58 is responsible for enabling or disabling one or more Access Medium Detectors 60 and selecting an access medium based on the detection results, system selection criteria, application status, and/or user request. The Selector 60 may inform the system selection result to the user 52 and/or application 54. The selector 60 communicates with application 54 via interface E, with preference database 56 via interface F, and with AMDs 60 via interface G. The selector 58 further communicates with user 52 via interface D.

Interface A: The user 52 may manually load new system selection criteria or modify existing system selection criteria in the preference database 56. System selection criteria are rules that the selector 58 will use for decision making. For example, if an application is active (i.e., sending/receiving data) and the WLAN access medium is available, then the system should select the WLAN access medium to transport data traffic. The user may input system selection criteria via a user-graphic interface (e.g., window-based programs).

Interface B: The application 54 may automatically load new system selection criteria or modify existing system selection criteria in the preference database 56. For example, an application 54 having a preference to use a given access medium X, and the preference may be loaded in the preference database 56 automatically when the application 54 is downloaded or installed.

Interface C: The user 52 may enable or disable the application 54. The user 52 may configure the application 54 setting for system selection. For example, the user 52 may configure the application 54 to prohibit automatic interaction with the preference database 56, such as when the user 52 decides to manually control the application 54-level preference via Interface A.

Interface D: The selector 58 may prompt the user to select an access medium. In another scenario, without such prompt the user 52 may request a specific access medium, wherein such request overrides other system selection criteria.

Interface E: The application 54 may provide status information to facilitate the selector 58 in system selection. For example, whether the application 54 is enabled or disabled influences the Selector 58 decision to enable or disable the Access Medium Detector 60. The Selector 58 may provide the system selection result to the application 54, based on the indication from the access medium detector(s) and system selection criteria stored in the preference database. For example, if the Selector 58 selects an access medium with higher bandwidth, the application 54 may switch to a codec with better quality. In another example, the Selector 58 relays the system detection results to the application 54 from an Access Medium Detector 60, so that the application 54 may display the results to the user 52.

Interface F: The Selector 58 obtains the system selection criteria from the preference database 56. If there is a change in the system selection criteria (e.g., modified by the user 52), the Selector 58 must fetch the new criteria from the preference database 56. The Selector identifies a change in the criteria by a variety of methods, such as: (1) The user 52 (or Application 54) provides information to the Selector 58 via the D (or E) Interface indicating a preference database 56 update, or (2) The Selector 58 periodically checks the preference database 56 for updates.

Interface G: The Selector 58 may enable or disable one or more Access Medium Detectors 60 based on user input, application status, and/or system selection criteria from the preference database 56. The Access Medium Detector 60 may indicate the detection result to the Selector 58.

Provisioning the MS with WLAN Information

The following discussion details provisioning of the WLAN information in the Mobile Station (MS) and methods implemented at the MS to minimize unnecessary WLAN scanning based on WLAN advertisement from the cellular network via signaling messages. A network supporting cdma2000 protocols is provided as an example in the following discussion. In the context of the present description, provisioning refers to the communication of WLAN parameters and configuration information to the MS necessary for establishment of communication with the WLAN.

A conventional provisioning method manually configures the MS with the necessary information (e.g., 802.11a/b frequencies, list of service identifiers, etc.) for the MS to detect WLAN coverage provided by a service provider. Extended Service Set Identifier (ESSID) may be used to identify all Access Points (AP) in a WLAN operator network. Different operators will use different ESSIDs. Thus, the list of ESSIDs may correspond to a list of WLAN operators accessible by the MS.

An alternative to manual provisioning is to provision the MS with the WLAN information via an Over-The-Air Provisioning (OTAP) type protocol. The detail of OTAP is described in the IS-683 standards that can be extended to support the provisioning of WLAN parameters. Another alternative is to automatically provision the MS with the WLAN information advertised via 1x signaling messages (discussed hereinbelow). The latter alternative is more dynamic than OTAP.

Once the MS has the necessary WLAN information, the MS determines when to scan for WLAN coverage. Generally, the WLAN will transmit a periodic beacon, which is a signal transmitted to advertise the WLAN. When the MS is able to receive the beacon, the MS is able to access the WLAN. The user 52 may enable or disable WLAN scan, however, the process may not be user friendly, because of the manual operations required by the user. An automated operation may be preferred, which is transparent to the user. According to one embodiment, a scanning method transparent to the user 52 provides for the MS to scan periodically. Periodic scanning is expensive when the MS is not in WLAN coverage area as scanning drains battery power.

If a cellular system, such as cdma2000, also provides WLAN service or has roaming agreement(s) with other WLAN operators, several options may be implemented for the cellular network to advertise WLAN information via cellular signaling messages in order to facilitate the MS to scan for WLAN coverage efficiently. Alternate embodiments may implement other cellular systems.

WLAN Advertisement via Signaling Messages.

In a first embodiment, a Base Station Controller (BSC) and Base Transceiver System (BTS) are configured with the knowledge of WLAN coverage in a cell sector. When the cellular service provider also provides WLAN services, the WLAN information is available to the cellular system. When there is WLAN coverage in the cell sector, the BTS periodically broadcasts WLAN provisioning information (e.g., 802.11a/b frequencies, ESSID, preferred roaming list, etc.) as overhead messages via common channels. The MS receives the WLAN provisioning information and uses the information to scan for WLAN. The WLAN provisioning information may be included within existing overhead messages. Alternately, the WLAN provisioning information may be provided in a signaling message defined specifically for WLAN provisioning.

Figure 2A:
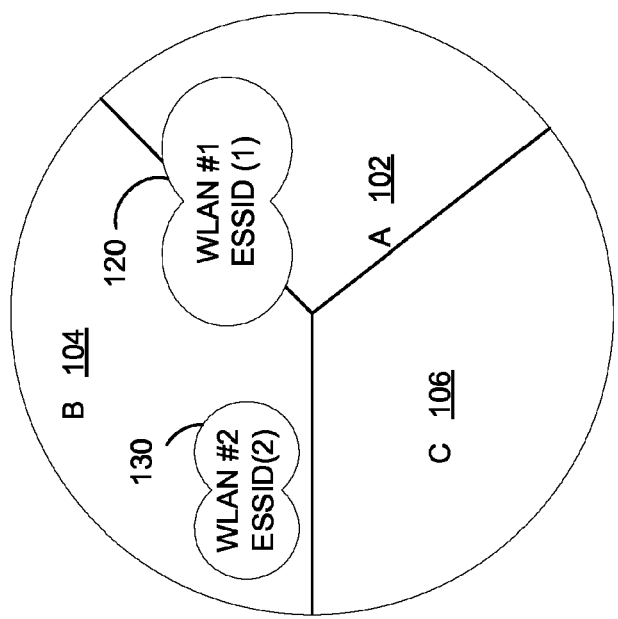
FIG. 2A is a communication configuration including cellular system capability and WLAN access.

FIG. 2A illustrates sectors within a cell of a cellular communication network. The cell includes sector A 102, sector B 104, and sector C 106. Within the cell are multiple WLANS, including WLAN #1 120 and WLAN #2 130. The WLAN #1 120 is identified by an ESSID(1). The WLAN #2 130 is identified by an ESSID(2). As illustrated, the WLAN #2 130 is contained within sector B 104, while WLAN #1 120 includes a portion within sector B 104 and a portion within sector A 102.

The preferred roaming list is a list of ESSIDs, each corresponding to a WLAN provider having a roaming agreement with the cellular system. The broadcast signaling messages may be triggered by cellular system provisioning, i.e., the cellular system broadcasts the message all the time whether or not there are MSs with WLAN capability. The cellular system continually transmits the WLAN provisioning information so as to advertise the WLAN. Alternately, the WLAN provisioning information may be transmitted via signaling messages, wherein the signaling messages are triggered on receipt of at least one registration message, and wherein the registration message indicates an MS with WLAN capability. Such WLAN capability indication may be a 1-bit flag in a registration message. Note that one benefit of registration triggered signaling is that the BTS may avoid broadcasting unnecessary WLAN provisioning information.

Upon receipt of the WLAN request from a MS, the BS may transmit the WLAN advertisement in a variety of ways. The BS may transmit the WLAN advertisement on a common channel, wherein multiple users are able to access the information. The BS may transmit the information directly to the MS using a signaling message. The BS may transmit only specific information, such as location identification for the WLAN.

Upon receiving the WLAN provisioning information in an overhead signaling message, the MS has no guarantee to detect an AP because the WLAN coverage within a cell sector may not be consistent. The probability of WLAN coverage increases in densely populated areas, such as shopping centers, stadiums, etc. Cellular systems desire to increase capacity in populated areas, and WLANs provide a means for increasing capacity in such areas. Cellular systems, therefore, implement WLANs in populated areas. On the other hand, WLAN coverage is not expected in rural areas, as capacity is generally not a concern in less populated areas.

Within cell 100, the BS (not shown) supporting sector B 104 transmits an identifier of those WLAN for which the BS has knowledge. For example, if the network has relationship with the WLAN #1 120, the BS in sector B 104 may transmit an advertisement of the WLAN #1 129, wherein the advertisement provides the ESSID(1). In this way, when the MS (not shown) receives the advertisement, the MS is able to scan for the WLAN #1 129 based on the ESSID(1). Similarly, the BS of sector A 102 would also be able to advertise WLAN #1 120. Additionally, if the cell network has a relationship with WLAN #2 130, the BS of sector B 104 may also advertise for WLAN #2 130 providing ESSID(2).

Figure 2B:
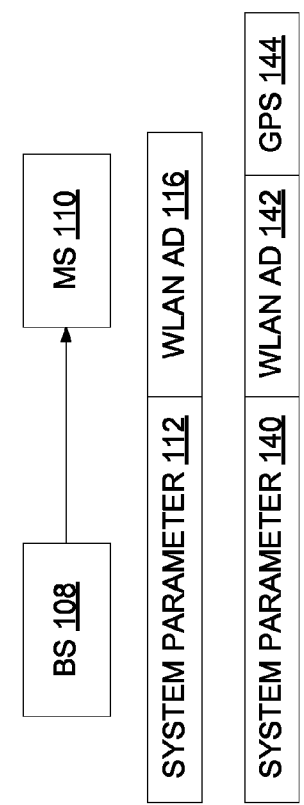
FIG. 2B illustrate signaling messages for advertising WLAN.

FIG. 2B illustrates two embodiments of signaling messages. In a first embodiment, the system parameter message includes system parameter information 112 and a WLAN advertisement field 116. The WLAN advertisement field 116 may be a single bit, wherein one polarity indicates WLAN availability and the opposite polarity indicates no availability. The WLAN advertisement 116 may be a multiple bit field providing further information, such as location information, or instruction to the MS regarding accessing WLAN information. In a second embodiment the system parameter message includes system parameter information 140, a WLAN advertisement 142, and a location information or Global Positioning System (GPS) 144.

In alternate embodiments, the WLAN provisioning/advertisement information is not broadcast periodically in overhead messages over common channels. When a MS wants to receive WLAN provisioning/advertisement information for a given cell sector, the MS uses a cellular signaling message, such as a cdma2000 registration message to request the WLAN provisioning/advertisement information from the BSC. Alternately, the MS may use a specific WLAN request message. In response, the BSC provides the WLAN provisioning/advertisement information upon demand. If the MS does not have a traffic channel, the BSC sends the reply to the MS over a common channel. The reply identifies available WLAN coverage in the designated cell sector. Note that the sector is identified by an identifier such as the Base_ID as used in cdma2000. When there is WLAN coverage in the sector, the reply from the BSC also includes the necessary WLAN provisioning/advertisement information so as to allow the MS to scan for WLAN coverage.

To avoid excessive signaling traffic (such as when multiple MSs request WLAN provisioning/advertisement information), the BSC may transmit the reply (i.e., the WLAN provisioning/advertisement information) via common channel(s). The WLAN information may be provided redundantly. In one embodiment, upon receipt of a request from a MS for WLAN provisioning/advertisement information, the BSC transmits the WLAN provisioning/advertisement information for a predetermined time period. The provision of such information on a common channel avoids excessive signaling messages incurred when other MSs request the same information at a proximate time.

The MS receives WLAN location information from the cellular network, wherein the WLAN location information identifies the APs supporting the WLAN. The location information may be latitude and longitude identifiers of an AP. The MS receives the WLAN location information and then displays the WLAN location information at the MS. The display may provide the AP location(s) in the context of a local map which may be stored in the MS. The display may be as illustrated in FIG. 5A, wherein a mobile wireless device 200 includes a keypad 204 and a display 202. The display identifies the location of the WLAN APs in a graphical manner. The display may be a textual message.

There are several methods for the MS to obtain the location information of APs supporting the WLAN. In one embodiment, the MS obtains the location information of APs from the signaling overhead messages via common channels or dedicated channels, as described hereinabove. In an alternate embodiment, the user instructs the MS to request the location information of APs from an application server. The server in this case may reside in the backend of the operator network, so the MS uses higher-layer protocols (e.g., IP) to communicate with the server and obtain the location information of APs.

Figure 5B:
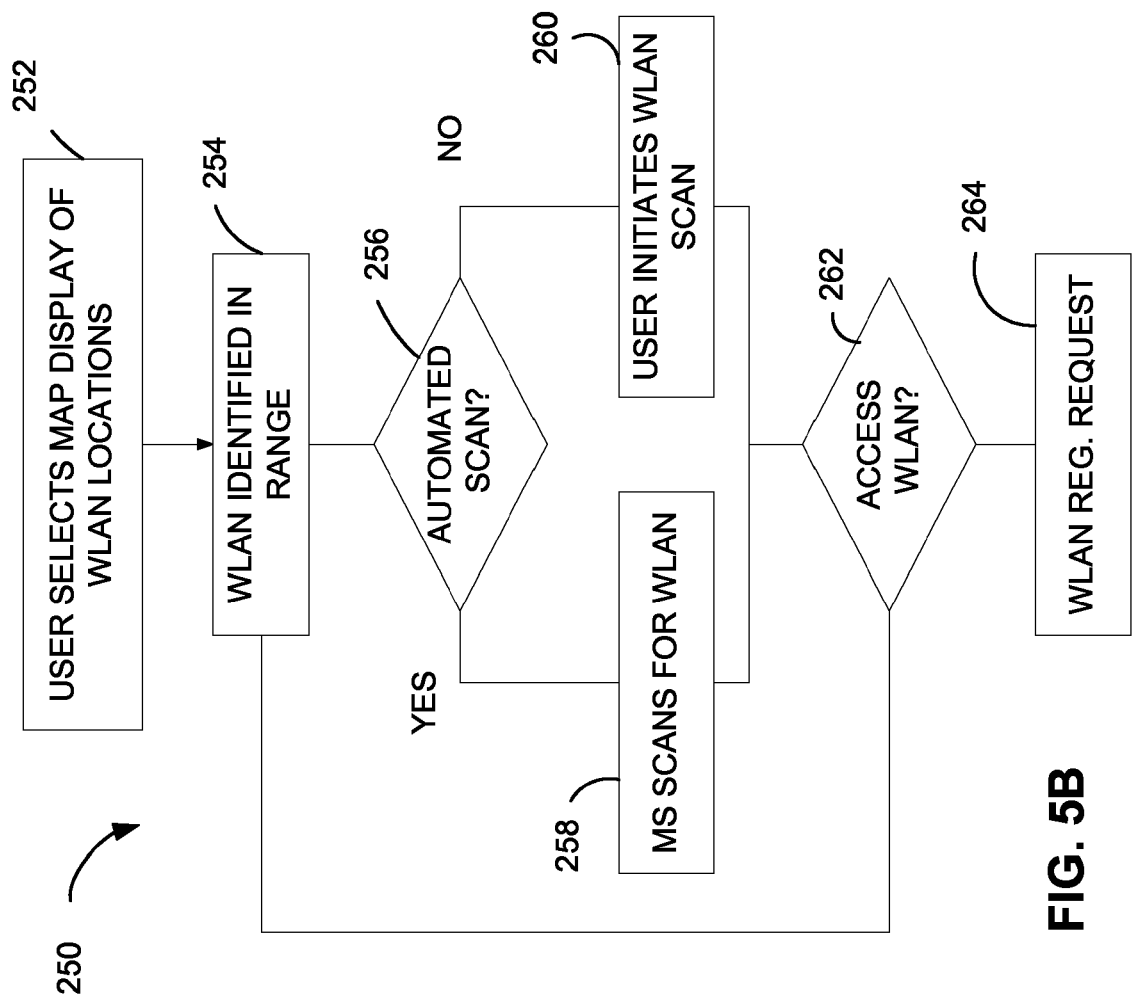
FIG. 5B is a flow diagram of a method for system detection and selection.
Figure 5A:
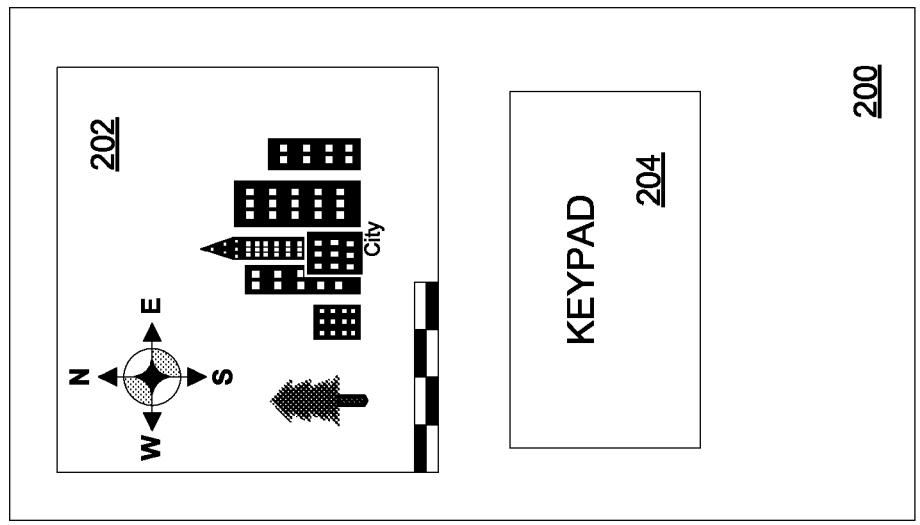
FIG. 5A is a mobile station having a display format associated with WLAN detection.

In one embodiment, illustrated in FIG. 5B, a method 250 provides a method of manual WLAN selection. At step 252 the user selects the map display function for identifying WLAN locations on the wireless device. The WLAN is identified within range at step 254. If an automated scan is enabled at decision diamond 256, processing continues to step 258 for the device to scan for WLANs. Else, processing continues to step 260 for the user to scan for WLANs. If a WLAN is accessible at decision diamond 262, the wireless device then sends a WLAN registration request at step 264. Else, processing returns to step 254 to await a WLAN identified in range.

Figure 3A:
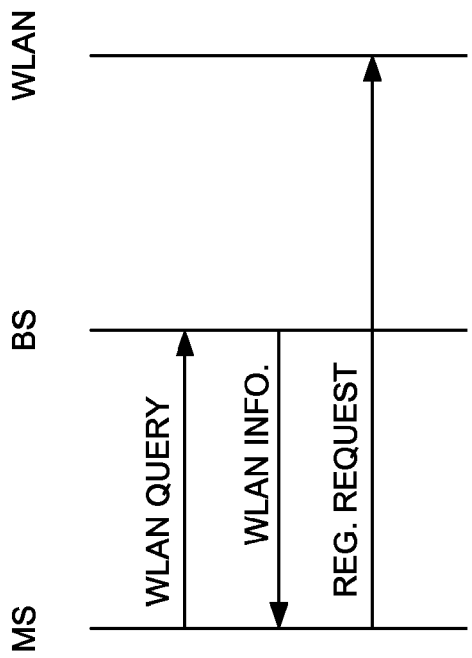
FIG. 3A is a timing diagram of signal flow in a system as in FIG. 2A.

FIG. 3A is a timing diagram for detection of a WLAN, wherein the MS sends a specific WLAN query or request for WLAN information to the BS. In response, the BS transmits the WLAN information to the MS, such as via a common channel WLAN advertisement. When a WLAN is available, the MS scans for the WLAN according to the WLAN information provided by the BS and sends a registration request to the WLAN to establish communication.

Figure 3B:
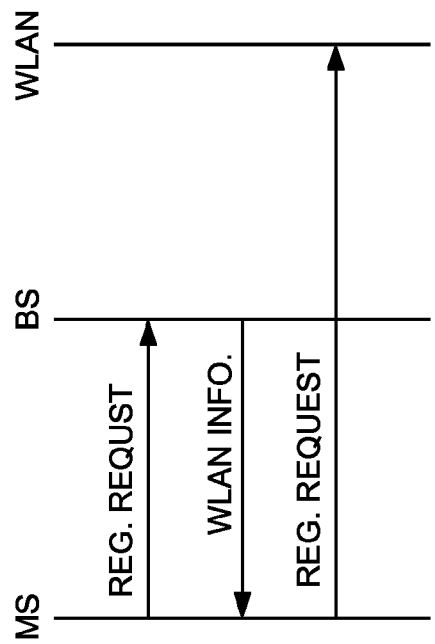
FIG. 3B is a timing diagram of signal flow in a system as in FIG. 2A.

FIG. 3B is a timing diagram for detection of a WLAN, wherein the MS sends a registration request to the BS (i.e., cellular network). The registration request may include a specific request for WLAN information. Alternatively, the registration request may not specifically request WLAN information, but rather prompts the BS to provide WLAN information. In response to the registration request, the BS provides the WLAN information to the MS. When a WLAN is available, the MS scans for the WLAN according to the WLAN information provided by the BS and sends a registration request to the WLAN to establish communication.

Figure 4:
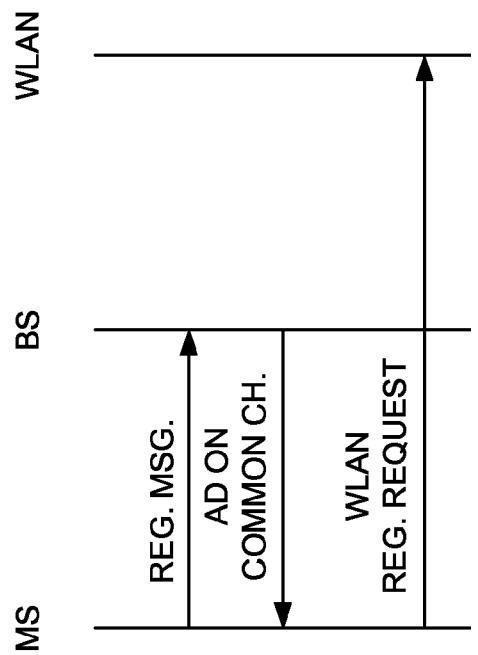
FIG. 4 is a timing diagram of signal flow in a system as in FIG. 2A.

FIG. 4 is a timing diagram for detection of a WLAN, wherein the MS sends a registration request to the BS (i.e., cellular network). The registration request may include a specific request for WLAN information. Alternatively, the registration request may not specifically request WLAN information, but rather prompts the BS to provide WLAN information. In response to the registration request, the BS broadcasts the WLAN information on a common channel. When a WLAN is available, the MS scans for the WLAN according to the WLAN information provided by the BS and sends a registration request to the WLAN to establish communication.

MS with One Tuner

When the Mobile Station (MS) has one tuner for communication. In such a device, the single tuner is used for communication with both the cellular system and the WLAN system. The MS detects WLAN coverage and performs system selection between WLAN and cellular system, wherein the MS may only tune to one system (WLAN or cellular) at a given time.

The MS performs system detection and selection in the following scenarios: (1) the MS is idle (not active in communication) with respect to the cellular network, having no dedicated channel, and desires to scan for WLAN; (2) the MS has an active packet data session with the cellular network, having a dedicated channel, and desires to scan for WLAN; (3) the MS is tuned to the WLAN, and desires to receive cellular pages; and (4) the MS is tuned to the WLAN but with low signal strength.

In scenario (1) described above, if the MS is idle in the cellular network (i.e., no dedicated channel), the MS may decide to scan for WLAN coverage based on one or more factors, e.g., user command, pre-configured preference, WLAN availability advertisement as received from the cellular network, etc. The MS tunes to the cellular network during each assigned paging slot interval. In this way, the MS is able to receive any page indicator from the cellular network. Once the MS monitors for cellular page indicator, the MS then is able to tune to the WLAN frequencies and use passive or active scanning to detect WLAN coverage.

In scenario (2) described above, the MS has an active packet data session in the cellular network (i.e., with dedicated channel). The MS may choose not to scan for WLAN while active data session in the cellular network. In this case, while the MS is active in the cellular network, the MS does not switch to WLAN even though it could access to WLAN. Although the MS might not be able to take the advantage of high-speed WLAN access, the MS would not experience service interruption. After the MS becomes idle in the cellular network, the MS tunes away from the cellular network to scan for the WLAN.

Alternatively, the cellular network may direct the MS to scan for WLAN coverage. In this case, the cellular network instructs the MS to scan for WLAN coverage. If there is WLAN coverage, the network may direct the MS to handover its packet data session to WLAN. This procedure might be useful when the network is overloaded or when the MS has low power strength. The procedure is described hereinbelow and is similar to the candidate frequency search procedure in a system supporting cdma2000.

The MS indicates any WLAN capability to the cellular network via over-the-air registration. If the MS is in a cell sector that has WLAN hot spots, the network may send a signaling message to request the MS to scan for WLAN coverage. The signaling request message contains WLAN information (e.g., frequencies, ESSID, etc.) and is sent over the MS's dedicated channel. The MS tunes to WLAN frequencies and actively or passively scans for the WLAN beacon. Then, the MS may have the following behaviors. (1) If the MS detects WLAN coverage, the MS tunes back to the cellular network to notify the WLAN search result. The cellular network then sends a signaling message to instruct the MS to handoff to WLAN. The MS tunes to WLAN and performs access authentication and optionally Mobile IP registration to handover its packet data session to WLAN. If access authentication or Mobile IP registration fails, the MS may tune back to the cellular network and originate for packet data service option.

(2) If the MS detects WLAN coverage, the MS does not return to the cellular network to notify the WLAN search result. Instead, the MS proceeds to perform WLAN access authentication and optionally Mobile IP registration to handover its packet data session to WLAN. In this case, if the cellular network didn't receive the signaling reply message after a timeout, the network assumes that the MS has left the cellular system and hence removes the MS's packet data session.

(3) If the MS fails to detect WLAN coverage, the MS re-tunes to the cellular network and sends a signaling reply message to inform the cellular network about the WLAN search result, and the network restores the active state of the MS's packet data session.

Continuing with scenario (2) as given hereinabove, still further, the MS may send a request to the cellular network to save the state information of the MS while the MS tunes away to scan for WLAN coverage. In this case, the MS requests the cellular network to save the state information while scanning for WLAN coverage. The MS sends a signaling request message (similar to the CDMA Offtime Report Message) to the 1x network. If the MS is in a cell sector that has WLAN hot spots, the network may send a signaling reply message that contains the necessary WLAN information for the MS to scan for WLAN coverage. If the MS detects WLAN coverage and is authenticated for access, the MS may proceed with Mobile IP registration to handover its packet data session via WLAN. If the MS fails to detect WLAN coverage or fails WLAN access authentication, the MS re-tunes to cellular network and sends a signaling message to request the cellular network to restore the active state of the MS's packet data session. If the cellular network did not receive the signaling request message after a specified timer has expired, the network assumes that the MS has left the cellular system and hence removes the MS's packet data session.

According to scenario (3) the MS is currently tuned to the WLAN.

If the MS is not transmitting or receiving frames over the WLAN, the MS periodically tunes back to the cellular network and monitors the Paging Indicator on the Quick Paging Channel. If the Paging Indicator is "0," then there is no page for the MS, and the MS immediately tunes back to the WLAN frequency. In this case, the time the MS spent on the cellular frequency is minimal (in the order of ms). If the Paging Indicator is "1," then the MS monitors the Paging Channel for its paging slot. In a cdma2000 type network, the Paging Indicator occurs at most 100 ms before the MS's paging slot. The paging slot is 80 ms. Paging Indicator of "1" does not guarantee that the page is for the MS because a second MS's International Mobile Subscriber Identity (IMSI) may be hashed coincidentally to the same Paging Indicator as the first MS. Thus, the MS may spend a maximum of 180 ms on the paging channel for nothing. If the page is for the MS, it will reply with Paging Response and stay in the cellular network to receive the incoming circuit-switched voice call.

At the time the MS is scheduled to monitor the cellular network paging, if the MS is in the middle of transmitting or receiving frames over the WLAN, the MS should stay in the WLAN to complete the data delivery and thus skip a paging cycle. Potentially, the MS could miss a page, and the call set-up time of an incoming circuit-switched voice call increases. If the MS receives a page for an incoming circuit-switched voice call, the MS may respond as follows.

1. Upon receiving the page, the MS may remain tuned to the cellular network to send Paging Response and accept the call. After the voice call, the MS may tune to the WLAN to continue the packet data session (if the MS still has WLAN coverage).
2. Upon receiving the page, the MS immediately tunes back to the WLAN and sends a Disassociation message to the AP. Then, the MS switches to the cellular network, sends a Paging Response, and accepts the call. After the voice call, the MS may need to start a new packet data session in either the cellular network or the WLAN.

According to scenario (4), if the MS is tuned to the WLAN but detects the signal strength has dropped below an acceptable threshold, the MS may tune to the cellular network and proceeds to handover the packet data session to cellular network.

FIG. 10A illustrates one example of scenario (2), wherein the MS 702 currently has a packet data session with the cell network 706. The MS 702 scans for a WLAN instruction message from the cell network 706. Using the WLAN instruction message, which provisions the MS, the MS scans for WLAN coverage. Upon detection of the WLAN, the MS 702 notifies the cell network of the result. As illustrated, the MS 702 detects a WLAN (AP 704), and in response sends a notification to the cellular network of the scan result. The cellular network may then instruct the MS 702 to switch to the WLAN. The decision to switch from the cellular network 706 to the WLAN is based on loading of the network, bandwidth of the user, data requirements, etc. Once the cellular network 706 instructs the MS 702 to switch, the cellular network 706 removes the data session. The MS 702 then initiates authentication with the AP 704. Note that if the authentication fails the MS may need to re-establish with the cellular network.

Figure 10B:
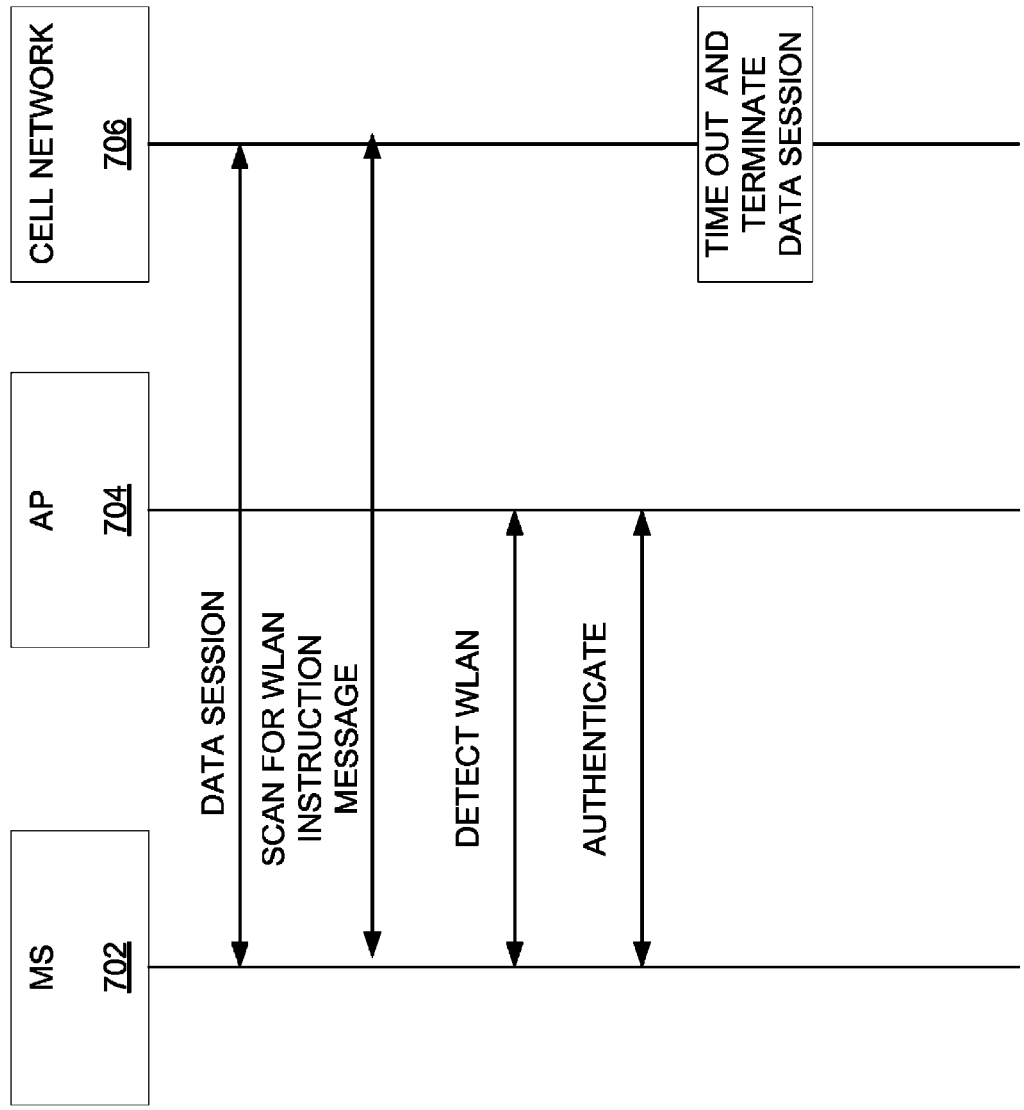
FIG. 10B is a timing diagram illustrating WLAN detection and selection.

FIG. 10B illustrates another example of scenario (2), wherein the MS 702 currently has a packet data session with the cell network 706. The MS 702 scans for a WLAN instruction message from the cell network 706. Using the WLAN instruction message, which provisions the MS, the MS scans for WLAN coverage. Upon detection of the WLAN, the MS 702 notifies the cell network of the result. As illustrated, the MS 702 detects a WLAN (AP 704), and in response initiates authentication with the AP 704. The cellular network 706 then starts a timer, and when a time out period is expired, the cellular network 706 removes the data session.

Figure 10C:
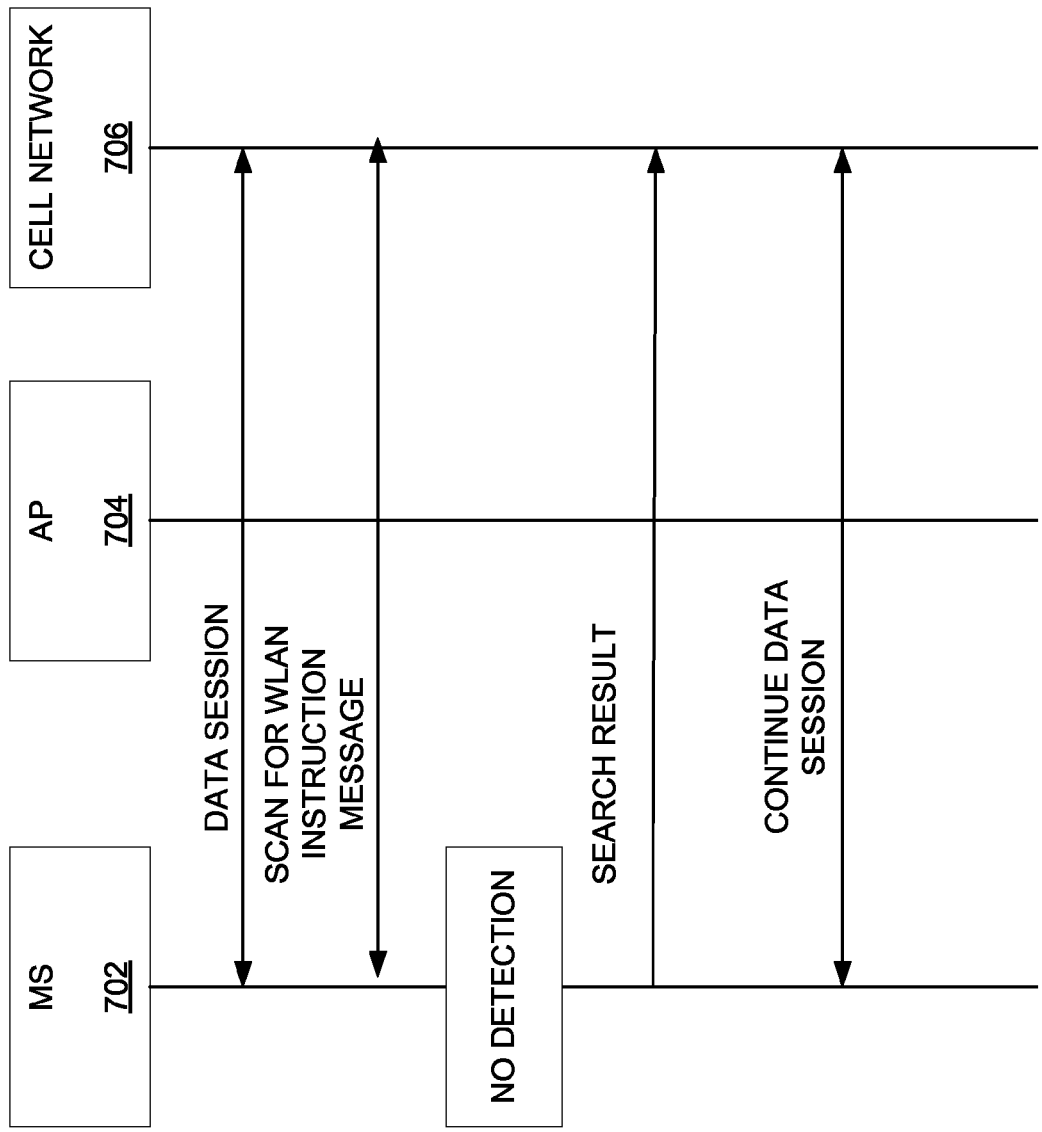
FIG. 10C is a timing diagram illustrating WLAN detection and selection.

FIG. 10C illustrates still another example, wherein the MS 702 is currently has a packet data session with the cell network 706. The MS 702 scans for a WLAN instruction message from the cell network 706. Using the WLAN instruction message, which provisions the MS, the MS scans for WLAN coverage. When no WLAN is detected, the MS 702 sends the search result to the cellular network 706. The MS 702 continues the data session with the cellular network 706.

Two Tuners

Figure 6:
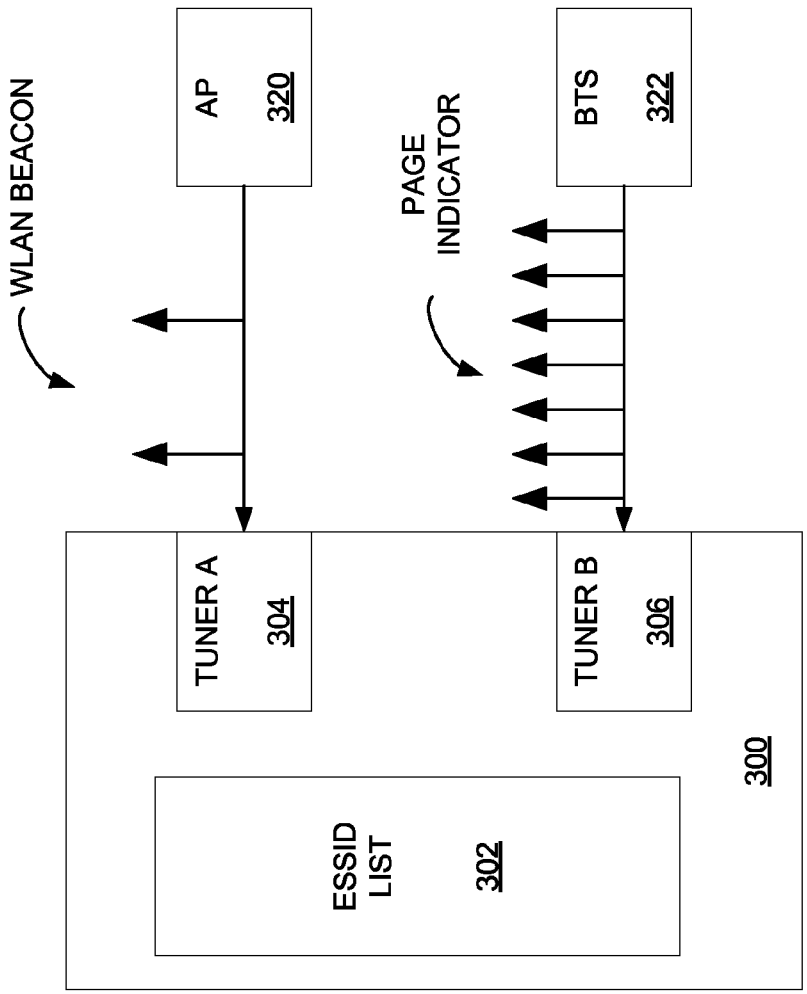
FIG. 6 is a block diagram of a mobile station with multiple tuners in communication with a WLAN and a cellular system.

In the following example, the Mobile Station (MS) has two tuners that can tune to a cellular frequency and the WLAN frequency simultaneously. A MS 300 is illustrated in FIG. 6 having an ESSID list 302, which is stored in memory, a first tuner, tuner A 304, and a second tuner, tuner B 306. Tuner A is configured for communication with a WLAN. Tuner B 306 is configured for communication with a wireless cellular network. As illustrated, when MS 300 is within range of accessing AP 320, tuner A 304 scans for a WLAN beacon transmitted by AP 320. The WLAN beacon is transmitted periodically and identifies the WLAN supported by AP 320. Tuner B 306 scans for a paging indicator from the cellular network transmitted by Base station Transceiver System (BTS) 322. In this way, the MS 300 may scan for WLAN coverage while also scanning for cellular pages. Thus, the MS 300 detects WLAN coverage and performs system selection between WLAN and the cellular system using one tuner for each access medium.

The MS 300 may implement any of a variety the physical configurations. For example, a "Type A" device is a single handheld device (e.g., phone, Personal Digital Assistant (PDA)) having a built-in WLAN tuner and a cellular network tuner, or a slotted-in WLAN tuner card and cellular tuner card (e.g., CDMA2000 card). Additionally, a "Type B" device is a laptop computing device, such as a personal computer, having a WLAN tuner card, wherein the laptop computing device is connected to a cellular handset, such as a handset supporting cdma2000 communications.

For a type A device, the MS 300 is a single physical device (e.g., handset, PDA) that supports both WLAN and cellular network protocols. The MS 300 has two Radio Frequency (RF) tuners: a first for the cellular network; and a second for the WLAN.

Returning to FIG. 6, note that the WLAN beacon and the page indicator are not necessarily transmitted at a same time or with a same period. The MS 300 scans for the WLAN beacon with tuner A 304 over a cycle having a first period. The MS 300 scans for the page indicator of the cellular network over a cycle having a second period. Typically the second period is shorter than the first period. In other words, the page indicators are generated more frequently than the WLAN beacons.

Power conservation is an important design criterion in system detection and selection. Conservation of power at the mobile device is highly desirable to extend the operational time of the device between recharging the battery. If the MS 300 decides to scan for WLAN coverage, it is desirable to minimize power consumption during such scan while still monitoring cellular paging.

The MS 300 may decide to scan for WLAN coverage based on one or more factors, e.g., user command(s), pre-configured preference(s), application status (e.g., on-going packet data session), WLAN availability advertisement as received from the cellular network, etc. One WLAN protocol defined by IEEE 802.11, and referred to herein as "802.11," allows the MS 300 to scan for WLAN coverage passively or actively. In passive scanning, the MS 300 listens for the WLAN beacon sent by the AP 320 on WLAN frequencies. The WLAN beacon contains the ESSID of AP 320, referred to as ESSID (AP 320). If the ESSID (AP 320) matches an ESSID stored in the MS 300 ESID list 302, this is an indication that the MS 300 has detected WLAN coverage, and that such coverage is provided by the MS 300 service provider. In active scanning, the MS 300 transmits a Probe Request that contains the ESSID of the MS 300. If the AP 320 receives the Probe Request and the ESSID of the MS 300 matches the ESSID of the AP 320, the AP 320 transmits a Probe Response to the MS 300. If the MS has a list of multiple ESSIDs, the MS may transmit a Probe Request containing an ESSID having the highest preference. The ESSID preference may be stored as a system selection parameter in the Preference Database (described hereinabove).

For conserving power, it is desirable to maximize a sleep mode for MS 300. In other words, it is desirable to maximize the time when MS 300 is using reduced power, or is in a sleep mode. Additionally, and as a result of such maximization, it is desirable to minimize the MS awake-time, or full power operation. Therefore, when the MS 300 periodically wakes, such as to check for pages or WLAN beacons, the MS 300 should simultaneously scan for any WLAN beacon as well as monitor for a cellular page indicator. If the paging cycle and beacon cycle are not synchronous, then the MS 300 wakes up according to the paging cycle to monitor the paging Indicator. In this scenario, when the MS 300 wakes, the MS 300 uses active scanning to scan for the WLAN beacon. If the paging cycle and beacon cycle are synchronous, then the MS wakes up periodically to monitor the paging Indicator and passively listen for any WLAN beacon. Synchronous paging and beacon cycles provide a more power-efficient operation due to the use of passive scanning; however, such synchronization requires the AP 320 clock be synchronized with the cellular network timing.

One method for synchronization of the paging cycle and WLAN beacon cycle is to schedule the WLAN beacon to arrive at the same time as the first paging indicator in the Quick Paging Channel. According to this method, each MS is scheduled to wake just before the scheduled WLAN beacon arrival time. Note that due to potential collisions, the WLAN beacon may not be sent at the scheduled time; thus, there is no guarantee that a given WLAN beacon will arrive at the scheduled or anticipated time. The WLAN beacon is transmitted as a frame of data and therefore, complies with the same rules for accessing the shared medium as other transmissions. After receiving the WLAN beacon, some MS may need to stay awake a little longer in order to scan for the paging indicator. Again, this method requires synchronization of the clocks for generating the WLAN beacon and the cellular network paging indicator. Such synchronization is not always feasible or available.

After the MS 300 detects WLAN coverage, receives the WLAN beacon, the MS 300 uses certain criteria to handover a packet data session from the cellular network to the WLAN. The criteria may include whether the MS is idle in cellular network (i.e., no dedicated channel) or whether the WLAN signal strength is stable, etc. The MS 300 may wait for a pending packet data session to go dormant in the cellular network. The MS 300d then performs packet data session handover (i.e., sending Mobile IP registration via WLAN). This may be useful to minimize service interruption. Similarly, the MS 300 may perform packet data session handover when the WLAN signal strength is above an acceptable threshold for a specified period of time. In this way, the MS 300 ensures that access to the WLAN is sustainable. The measure may be any measure of channel quality and/or signal strength. The threshold may be predetermined or may dynamically be adjusted based on the actual performance of the communication. This may be useful to avoiding any ping-pong effect whereby the MS 300 switches between WLAN access and cellular network access due to changing conditions or signal strength that is at the margin of tolerance for operation. Still further, upon detection of the WLAN, the MS 300 may notify the user and wait for the user to manually select WLAN.

Another consideration is to minimize power consumption while the MS 300 is receiving data via the WLAN and is monitoring for cellular paging. After the MS 300 performs the handover of the packet data session to the WLAN, the MS 300 may receive data via the WLAN as well as incoming circuit-switched voice calls via the cellular network. The MS 300 relies on the cellular sleep mode to conserve power while monitoring for cellular paging. The 802.11 protocol has a similar method for the MS 300 to conserve power while waiting for incoming data. If the cdma2000 Quick Paging Channel, or other similar mechanism, is supported, the MS 300 may further conserve power by synchronizing the cellular sleep mode and the 802.11 power-saving mode.

According to the 802.11 power-saving mode the MS 300 sends an Association Request (AR) to the AP 320, wherein the AR indicates a number (e.g., N) of beacon periods that the MS 300 is to be in the power saving mode. The AP 320 keeps track a list of MSs that have enabled the power saving mode. The AP 320 buffers frames destined for the MS 300 while it is in the power saving mode. The AP 320 periodically sends a beacon containing the Traffic Indication Map (TIM) (not shown) indicating whether each MS has frames buffered in the AP 320. The MS 300 wakes up every N beacon periods to monitor the beacon and the included TIM. If the TIM indicates pending frames for the MS 300, the MS 300 sends a Power-Save Poll to the AP 320, to which the AP 320 responds by sending one frame of data to the MS 300. The frame will include a control field, wherein a control bit indicates if there are more frames buffered for the MS 300. If the control bit is set, the MS 300 is required to send another Power-Save Poll to the AP 320. If the control bit is cleared, there are no pending frames for MS 300.

The MS 300 may achieve further power conservation when the 802.11 power-saving mode is synchronized with the cellular sleep mode. In this way, the MS wakes up periodically to monitor for both beacon (and included TIM) as well as to monitor for the cellular page indicator. Synchronization may be achieved by synchronizing the clock of the AP 320 to the cellular timing, wherein the cellular paging interval and WLAN beacon interval are in lock-step. For example, when the WLAN beacon interval is equal to the cellular paging interval, the beacon may be scheduled to arrive at the same time as the first paging indicator in the cellular system, such as provided on the cdma2000 Quick Paging Channel. Each MS wakes up just before the beacon arrival. Some MS may need to stay a little longer (e.g., 40 ms after WLAN beacon arrival) to receive the paging indicator.

For systems such as those without the cdma2000 Quick Paging Channel, the Beacon cycle and paging cycle generally are not synchronous, i.e., the time difference between the WLAN beacon and the cellular paging slot may vary for each MS. If the time difference is small, then the MS can wake up to monitor both the Beacon and its paging slot before goes back to sleep. If the time difference is large, such procedure may not be power-efficient for each MS to wake up and stay awake to monitor both the WLAN beacon and the paging slot. Note that each MS may have a designated paging slot, and therefore, the differential time required to receive both the WLAN beacon and the paging indicator may not be the same for each MS and typically will be different.

Figure 7:
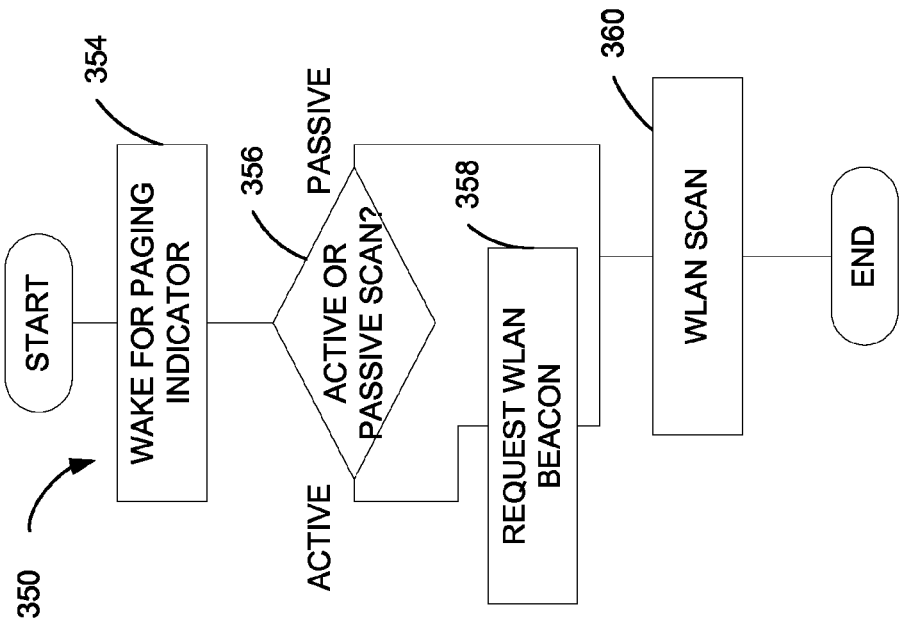
FIG. 7 is a flow diagram of a method for system detection.

FIG. 7 illustrates a process 350 applicable to the MS 300. The MS 300 first wakes for a cellular paging indicator (step 354). The MS 300 may schedule this waking to coincide with a common time for a first paging indicator slot and a WLAN beacon, or may use some other criteria to determine when to wake. The MS 300 determines (decision diamond 356) whether to perform active WLAN scanning or passive WLAN scanning. For active scanning, the MS 300 sends a request for a WLAN beacon (step 358), and continues to then scan for the WLAN beacon (step 360). In this way, the MS 300 avoid extended power consumption while for waiting for a next scheduled WLAN beacon transmission. For passive scanning, the MS scans for the WLAN beacon (step 360) until a beacon is detected.

Figure 8:
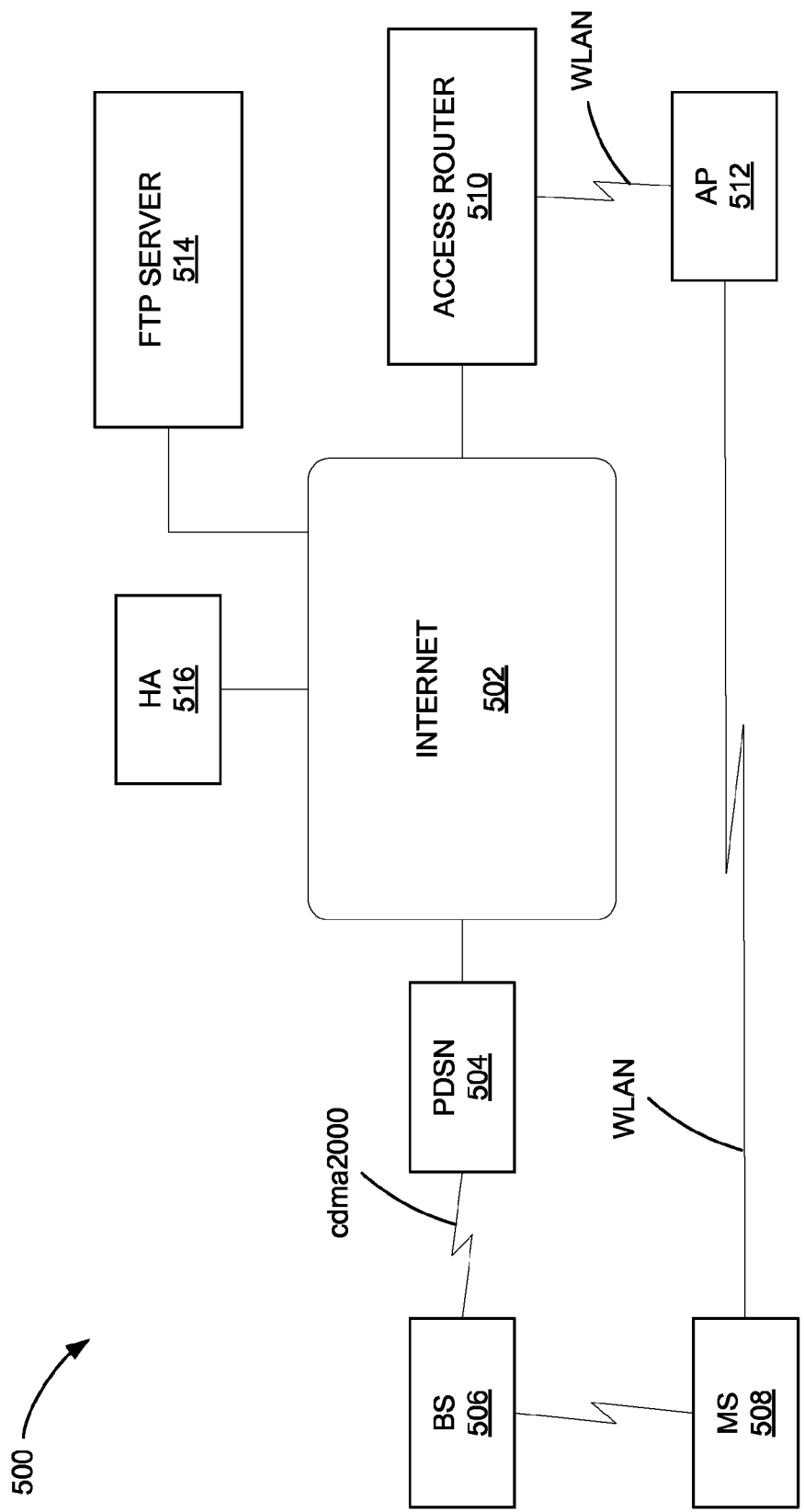
FIG. 8 is a communication system supporting wireless cellular communications, wireless local area network communications, and Internet communications.

FIG. 8 illustrates communication flow within a network 500 including both cellular communications and Internet Protocol (IP) communications. The Internet 502 is coupled to a Home Agent (HA) 516 associated with MS 508. The Internet is further coupled to a File Transfer Protocol (FTP) server 514, an Access Router 510, and a Packet Data Service Node (PDSN) 504. The Access Router 510 communicates with an AP 512 via a wireless interface. The interface between the Access Router 510 and the AP 512 is a WLAN interface, wherein the Access Router 510 and the AP 512 are part of a WLAN. When the MS 508 is situated so as to communicate with the AP 512, the MS 508 accesses the WLAN via a wireless interface with the AP 512. For cellular communications, the MS 508 communicates over the air with a BS 506. The BS 506 is configured for communication with PDSN 504 via an interface identified as cdma2000. Such interface may be consistent with another cellular protocol.

Note that a wireless device may include multiple tuners, wherein each tuner is adapted for communication with a different access medium, e.g., WLAN and cellular network. Alternately, a wireless device may be coupled to another wireless device, wherein each includes a tuner, and the combination results in multiple tuners. In one such configuration, a laptop (computing device) operates together with a cellular handset. The laptop includes a WLAN card or built-in WLAN port, while the handset supports cellular communications. WLAN information (e.g., ESSID) is provisioned in the laptop to scan for WLAN coverage.

Figure 9:
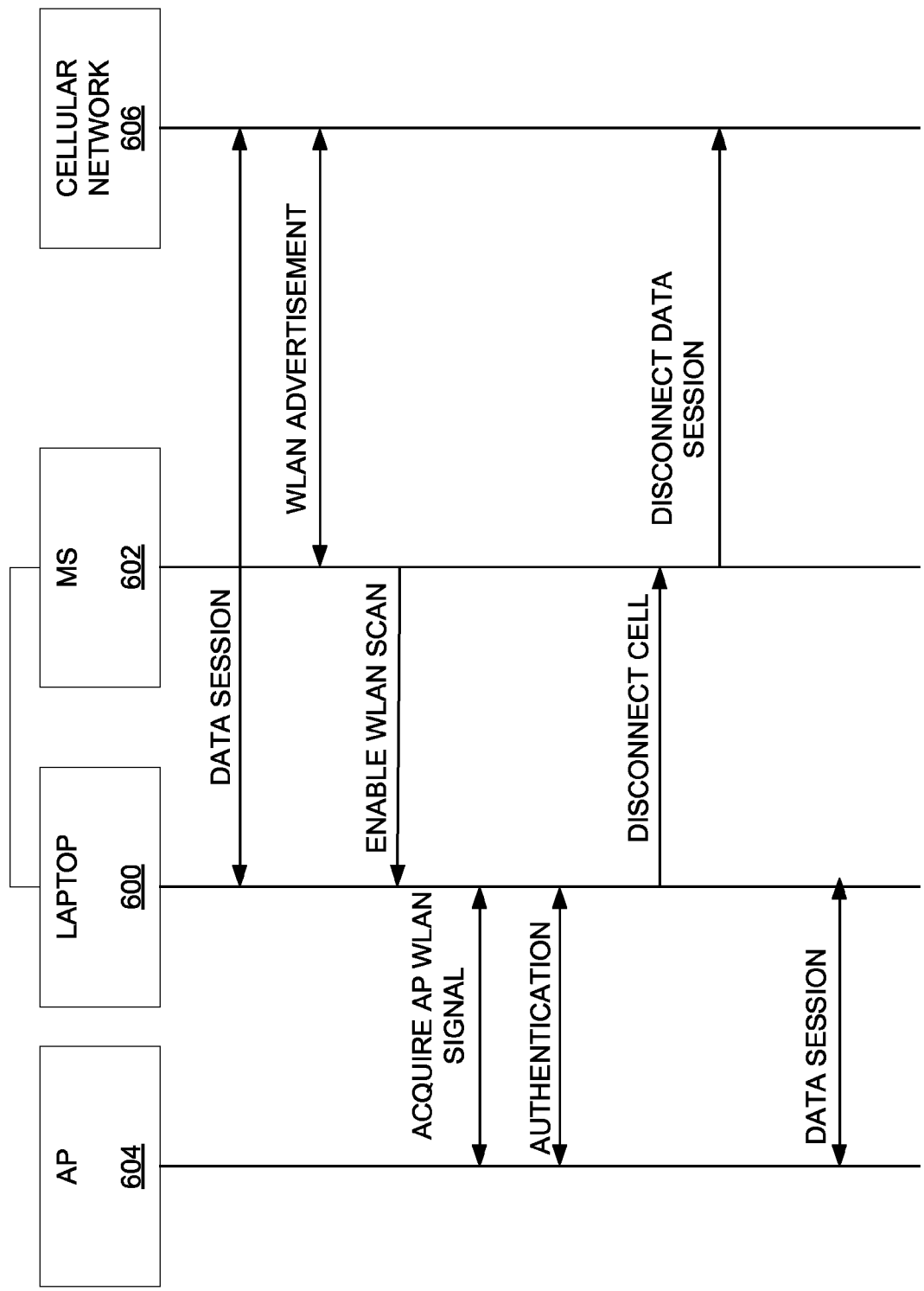
FIG. 9 is a timing diagram illustrating WLAN detection and selection.

FIG. 9 illustrates signal and message flow in such a configuration. As illustrated, the laptop 600 is coupled to the MS 602 for communication. The laptop 600 has a tuner, which is currently adapted for communication with a WLAN, such as via AP 604. The MS 602 has a tuner, which is currently adapted for communication with a cellular network 606, such as a cdma2000 network.

In the configuration illustrated in FIG. 9, the laptop 600 is currently processing a packet data session with the cellular network 606 through the MS 602. During the packet data session, when the MS 602 receives a WLAN availability advertisement from the cellular network 606, the MS 602 may notify the laptop 600 via a signaling protocol defined between the MS 602 and the laptop 600. On receipt of such notification the laptop 600 may choose to scan for WLAN coverage. The laptop 600 may then perform system selection based on WLAN signal strength and acquire a WLAN signal from AP 604. The laptop 600 and the AP 604 then authenticate the connection. Once authentication is completed, the laptop 600 disconnects from the cellular network through the MS 602. The MS 602 then disconnects the packet data session with the cellular network 606. From this point, the packet data session is processed between the laptop 600 and the AP 604.

As detailed in the example given above and with respect to FIG. 9, when the laptop 600 has a current packet data session with the cellular network 606, the laptop may detect a strong WLAN signal through the resident tuner. The laptop 600 may choose to switch to WLAN access immediately. Upon WLAN detection, the laptop 600 needs to be authenticated for WLAN access. For single subscription/authentication of WLAN and cdma2000, the secret is stored in the handset's User Interface Module (UIM) (not shown), which may be removable or non-removable. Thus, signaling messages are needed between the laptop 600 and MS 602 to perform WLAN access authentication. If the WLAN access authentication is successful, the laptop 600 performs Mobile IP registration via the WLAN (i.e., via AP 604). If the Mobile IP registration is successful, the laptop 600 sends a message (e.g., AT command) to the MS 602 to release the packet data session. The MS 602 may identify the data session by a Service Option (SO), such as SO 33 in cdma2000. The laptop 600 may then maintain the packet data session via the cellular network until handover of the packet data session to the WLAN is completed.

Alternatively, the laptop may switch to the WLAN if the packet data session currently has no data pending transfer so as to minimize service interruption (e.g., downloading a file). Upon detecting a strong WLAN signal, the laptop 600 waits for a given time period (e.g., several seconds) to detect any activity of data transfer. If no activity is detected, the laptop 600 performs WLAN access authentication, followed by Mobile IP registration via the WLAN, and finally release of the cellular packet data service option, as described above.

When the laptop 600 is accessing WLAN and the signal strength deteriorates below an acceptable threshold, the laptop 600 may trigger the MS 602 to originate a packet data service option. The trigger may be an explicit signaling message (e.g., AT commands) or Mobile IP registration message, etc. wherein the laptop 600 desires to send via the cellular network. If the Mobile IP registration is successful, the laptop 600 continues the packet data session via the cellular network. In order to avoid ping-pong effect between WLAN and the cellular network, hysteresis mechanisms may be used, such as, switching to the WLAN only when the WLAN signal remains above a specified threshold for a specified period of time. The laptop may switch between the WLAN and the cellular network automatically (e.g., operation transparent to the user) or manually initiated by the user.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transferring communications between a cellular network and a Wireless Local Access Network (WLAN), comprising:
   receiving, at a first wireless device, a WLAN advertisement on a common communication channel of the cellular network, wherein the WLAN advertisement includes an Extended Service Set Identifier (ESSID) corresponding to the WLAN; and
   sending an instruction to enable a second wireless device to scan for a WLAN beacon of the WLAN, based on the WLAN advertisement.

2. The method of claim 1, further comprising:
   transmitting a notification of receipt of the WLAN advertisement.

3. The method of claim 1, further comprising:
   receiving an instruction to disconnect the first wireless device from the cellular network; and
   disconnecting the first wireless device from the cellular network.

4. The method of claim 3, further comprising:
   receiving an instruction to resume communication with the cellular network; and
   reestablishing communications with the cellular network.

5. The method of claim 1, wherein receiving the WLAN advertisement comprises receiving the WLAN advertisement periodically.

6. The method of claim 1, wherein receiving the WLAN advertisement comprises identifying the WLAN as having a roaming agreement with the cellular network.

7. The method of claim 1, wherein the first device is one of a PC card, compact flash, external modem or internal modem.

8. The method of claim 1, wherein the second device is a laptop computer.

9. The method of claim 1, further comprising:
   comparing the ESSID to an ESSID list; and
   in response to the ESSID in the WLAN advertisement matching an ESSID in the ESSID list, executing the sending the instruction.

10. The method of claim 1, wherein the WLAN advertisement comprises position information for an Access Point (AP) supporting the WLAN.

11. The method of claim 10, further comprising:
    comparing the position information to a current location of the first wireless device; and
    determining if the current location of the first wireless device is proximate to the AP.

12. The method of claim 10, wherein the position information includes the latitude and the longitude of the AP.

13. The method of claim 10, further comprising:
    displaying the position information for the AP on the second wireless device.

14. An apparatus configured to transfer communications between a cellular network and a Wireless Local Access Network (WLAN), comprising:
    means for receiving, at a first wireless device, a WLAN advertisement on a common communication channel of the cellular network, wherein the WLAN advertisement includes an Extended Service Set Identifier (ESSID) corresponding to the WLAN; and
    means for sending an instruction to enable a second wireless device to scan for a WLAN beacon of the WLAN, based on the WLAN advertisement.

15. The apparatus of claim 14, further comprising:
means for transmitting a notification of receipt of the WLAN advertisement.

16. The apparatus of claim 14, further comprising:
means for receiving an instruction to disconnect the first wireless device from the cellular network; and
means for disconnecting the first wireless device from the cellular network.

17. The apparatus of claim 16, further comprising:
means for receiving an instruction to resume communication with the cellular network; and
means for reestablishing communications with the cellular network.

18. The apparatus of claim 14, comprising means for receiving the WLAN advertisement periodically.

19. The apparatus of claim 14, comprising means for identifying the WLAN as having a roaming agreement with the cellular network.

20. The apparatus of claim 14, wherein the first device is one of a PC card, compact flash, external modem or internal modem.

21. The apparatus of claim 14, wherein the second device is a laptop computer.

22. The apparatus of claim 14, further comprising:
means for comparing the ESSID to an ESSID list; and
means for executing the sending the instruction in response to the ESSID in the WLAN advertisement matching an ESSID in the ESSID list.

23. The apparatus of claim 14, wherein the WLAN advertisement comprises position information for an Access Point (AP) supporting the WLAN.

24. The apparatus of claim 23, further comprising:
means for comparing the position information to a current location of the first wireless device; and
means for determining if the current location of the first wireless device is proximate to the AP.

25. The apparatus of claim 23, wherein the position information includes the latitude and the longitude of the AP.

26. The apparatus of claim 23, further comprising:
means for displaying the position information for the AP on the second wireless device.

27. A non-transitory computer-readable medium, comprising instructions stored thereon that, if executed by a processor, cause the processor to:
receive, at a first wireless device a WLAN advertisement on a common communication channel of the cellular network, wherein the WLAN advertisement includes an Extended Service Set Identifier (ESSID) corresponding to the WLAN; and
send an instruction to enable, based on the WLAN advertisement, a second wireless device to scan for a WLAN beacon of the WLAN.

28. The computer-readable medium of claim 27, further comprising instructions that, if executed by the processor, cause the processor to:
transmit a notification of receipt of the WLAN advertisement.

29. The computer-readable medium of claim 27, further comprising instructions that, if executed by the processor, cause the processor to:
receive an instruction to disconnect the first wireless device from the cellular network; and
disconnect the first wireless device from the cellular network.

30. The computer-readable medium of claim 29, further comprising instructions that, if executed by the processor, cause the processor to:
receive an instruction to resume communication with the cellular network; and
reestablish communications with the cellular network.

31. The computer-readable medium of claim 27, further comprising instructions that, if executed by the processor, cause the processor to:
receive the WLAN advertisement periodically.

32. The computer-readable medium of claim 27, further comprising instructions that, if executed by the processor, cause the processor to:
identify the WLAN as having a roaming agreement with the cellular network.

33. The computer-readable medium of claim 27, wherein the first device is one of a PC card, compact flash, external modem or internal modem.

34. The computer-readable medium of claim 27, wherein the second device is a laptop computer.

35. The computer-readable medium of claim 27, further comprising instructions that, if executed by the processor, cause the processor to:
compare the ESSID to an ESSID list; and
execute the sending the instruction in response to the ESSID in the WLAN advertisement matching an ESSID in the ESSID list.

36. The computer-readable medium of claim 27, wherein the WLAN advertisement comprises position information for an Access Point (AP) supporting the WLAN.

37. The computer-readable medium of claim 36, further comprising instructions that, if executed by the processor, cause the processor to:
compare the position information to a current location of the first wireless device; and
determine if the current location of the first wireless device is proximate to the AP.

38. The computer-readable medium of claim 36, wherein the position information includes the latitude and the longitude of the AP.

39. The computer-readable medium of claim 36, further comprising instructions that, if executed by the processor, cause the processor to:
display the position information for the AP on the second wireless device.

40. A first wireless device configured to transfer communications between a cellular network and a Wireless Local Access Network (WLAN), comprising:
a tuner configured to receive a WLAN advertisement on a common communication channel of the cellular network, wherein the WLAN advertisement includes an Extended Service Set Identifier (ESSID) corresponding to the WLAN; and
a processor coupled to the tuner, and configured to send an instruction to enable, based on the WLAN advertisement, a second wireless device to scan for a WLAN beacon of the WLAN.

41. The device of claim 40, wherein the processor is configured to transmit a notification of receipt of the WLAN advertisement.

42. The device of claim 40, wherein the processor is configured to receive an instruction to disconnect the first wireless device from the cellular network, and to disconnect the first wireless device from the cellular network.

43. The device of claim 42, wherein the processor is configured to receive an instruction to resume communication with the cellular network, and the tuner is configured to reestablish communications with the cellular network based on the instruction to resume communication.

44. The device of claim 40, wherein the tuner is configured to receive the WLAN advertisement periodically.

45. The device of claim 40, wherein the processor is configured to identify the WLAN as having a roaming agreement with the cellular network.

46. The device of claim 40, wherein the first device is one of a PC card, compact flash, external modem or internal modem.

47. The device of claim 40, wherein the second device is a laptop computer.

48. The device of claim 40, wherein the processor is configured to compare the ESSID to an ESSID list, and send the instruction to enable in response to the ESSID in the WLAN advertisement matching an ESSID in the ESSID list.

49. The device of claim 40, wherein the WLAN advertisement comprises position information for an Access Point (AP) supporting the WLAN.

50. The device of claim 49, wherein the processor is configured to compare the position information to a current location of the first wireless device; and to determine if the current location of the first wireless device is proximate to the AP.

51. The device of claim 49, wherein the position information includes the latitude and the longitude of the AP.

52. The device of claim 49, wherein the processor is configured to display the position information for the AP on the second wireless device.

\* \* \* \* \*